United States Patent [19]

Yamazaki et al.

[11] Patent Number: 4,900,893
[45] Date of Patent: Feb. 13, 1990

[54] LASER OSCILLATION CONTROL SYSTEM

[75] Inventors: Etsuo Yamazaki; Tsuyoshi Nagamine; Shigeru Isohata, all of Hachioji, Japan

[73] Assignee: Fanuc Ltd, Minamitsuru, Japan

[21] Appl. No.: 273,516

[22] PCT Filed: Feb. 19, 1988

[86] PCT No.: PCT/JP88/00185

§ 371 Date: Nov. 3, 1988

§ 102(e) Date: Nov. 3, 1988

[87] PCT Pub. No.: WO88/06938

PCT Pub. Date: Sep. 22, 1988

[30] Foreign Application Priority Data

Mar. 20, 1987 [JP] Japan .................................. 62-66778

[51] Int. Cl.$^4$ ............................................ B23K 26/02
[52] U.S. Cl. ............................ 219/121.82; 219/121.61; 219/121.84
[58] Field of Search ....................... 219/121.82, 121.61, 219/121.67, 121.72, 121.84, 121.6, 121.85; 364/474.08

[56] References Cited

U.S. PATENT DOCUMENTS

| | | | |
|---|---|---|---|
| 3,700,850 | 10/1972 | Lumley et al. | 219/121.62 X |
| 4,323,755 | 4/1982 | Nierenberg | 219/121.75 X |
| 4,689,467 | 8/1987 | Inoue | 219/121.82 X |
| 4,734,729 | 3/1988 | Hertzet et al. | 219/121.6 X |
| 4,769,529 | 9/1988 | Tanimoto et al. | 219/121.83 X |

Primary Examiner—C. L. Albritton
Attorney, Agent, or Firm—Staas & Halsey

[57] ABSTRACT

A laser oscillation control system performing laser beam machining by controlling an X-Y table by a numerical control system.

An output of a laser oscillator is controlled by a G-code included in a program from a command system input to a numerical control system. An output power is commanded by an address S, a frequency by an address P and a pulse duty by an address Q. These command data are fed to a high-frequency power source to control a laser output.

4 Claims, 1 Drawing Sheet

LASER OSCILLATION CONTROL SYSTEM

BACKGROUND OF THE INVENTION

The present invention relates to a laser oscillation control system, and more particularly to a laser oscilation control system wherein an output of the laser oscillator is controlled by a G-code.

Today, laser machining equipment having a numerical control system is widely used. In such laser machining equipment, an X-Y table is controlled by the numerical control system, a work is set in position on the X-Y table so that the work is subject to machining such as cutting by a laser beam emitted from a stationary laser oscillator. In this type of laser machining equipment, it is a widely practiced system that an output of laser is increased or decreased by a dial on an operation panel or the like mounted on the laser machining equipment at the time of machining.

In such a system, however, the setting of the laser output has to be changed by the dial every time a different kind of workpiece is loaded. It is also troublesome for the operator to be frequently involved in performing a setting.

SUMMARY OF THE INVENTION

It is an object of the present invention for solving the aforesaid problem to provide a laser oscillation control system wherein an output of a laser oscillator is controlled by a G-code.

In order to solve the aforesaid problem, the present invention provides a laser oscillation control system for performing laser machining by controlling an X-Y table with a numerical control system, wherein an output of a laser oscillator is controlled by a G-code of a program of the numerical control system and other addresses.

With the control system, the output of the laser oscillator is controlled with the program. Therefore, the operator is not required to set the output each time a different kind of workpiece is loaded.

DESCRIPTION OF THE PREFERRED EMBODIMENT

Figure 1:
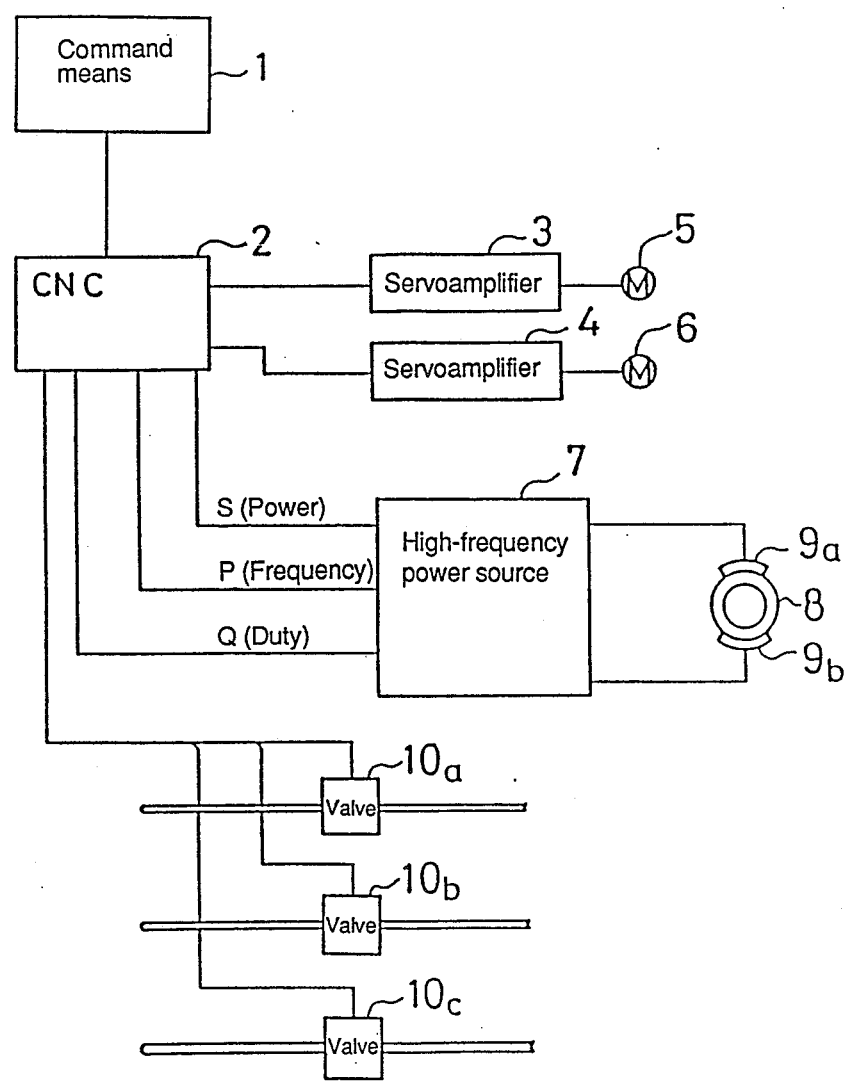
FIG. 1 is a block diagram of a laser oscillation control system according to the present invention.

An embodiment of the present invention will hereinafter be specifically described with reference to the drawing.

FIG. 1 is a block diagram of a laser oscillation control system according to an embodiment of the present invention. Denoted by numeral 1 is a command means which can include a program or the like such as a paper tape reader or a cassette tape reader, etc., as an input device.

Denoted by numeral 2 is a numerical control system which reads and interprets the program from the command means 1 and applies the command to other units. The program is commanded in the following form:

| G01 | X2000 | Y3000 | F4000 |
|-----|-------|-------|-------|
| S600 | P1000 | Q5 | CR | where "G01" is a G-code which represents a linear cutting mode. Other G-codes such as "G02" and "G03" for circular cutting can be used. "X2000" and "Y3000" are respectively incremental command values to represent a movement of the table, but the command values can also be used for an absolute command. F represents a moving speed of the table or a machining speed. "S600" represents an output of a laser beam in which "600" denotes that the output of the laser beam is 600 W. "P1000" represents frequency pulse output which is 1000 Hz. "Q5" represents a duty ratio of the pulse, that is, a percentage of a pulse-on time to one cycle of a pulse, which is 5% in this case.

Denoted by numerals 3 and 4 are servoamplifiers, which respectively receive the commands concerning an X-axis and a Y-axis from the numerical control system 2 to drive servomotors 5 and 6. The servomotors 5 and 6 are driven in response to commands from servoamplifiers 3 and 4 to move an X-Y table (not shown).

Denoted by numeral 7 is a high-frequency power supply, which outputs a high-frequency pulse power of several MHz. In this case, a power S, a pulse frequency P and a duty ratio Q are determined according to commands from the numerical control system 2. Denoted by numeral 8 is a laser tube wherein laser medium gas circulates. Denoted by numerals 9a and 9b are electrodes through which the high-frequency pulse from the high-frequency power supply 7 is supplied to the laser tube 8 where electric discharge is caused by the laser medium gas, and a laser beam is oscillated and amplified.

Denoted by numeral 10a, 10b and 10c are on-off valves for assist gas. The valves 10a–10c are controlled by commands from the numerical control system 2. For instance, the commands for controlling turning on and off the assist gas include:

G24P1CR where "G24" represents a G-code for controlling the assist gas, and "P1" represents a command for turning on a nozzle of a first assist gas.

In such a manner, not only commands for controlling the power, the pulse frequency and the duty ratio of the laser beam, but also commands for controlling the assist gas can be given by the G-code, so that an operator is not required to set machining conditions.

In the case of the above embodiment, the command for a machining operation is given through a paper tape. It may, however, be input directly to a memory through a keyboard or the like.

As explained above, according to the present invention, output of laser beam is controlled by the G-code, so that a machining operation can be performed automatically without requiring the operator to set the machining conditions for each machining operation.

We claim:

1. A laser oscillation control system including a laser oscillator for performing laser machining by controlling the X-Y table with a numerical control system, an output of the laser oscillator being controlled by a G-code, a power output command, a pulse frequency command and a pulse duty ratio included in a command program of the numerical control system.

2. A laser oscillation control system for laser machining, comprising:
    an X-Y table;
    command means for outputting a command program including a predetermined G-code, a power output command, a pulse frequency command and a pulse duty ratio;

numerical control means, connected to said command means, for receiving said command program, interpreting said command program and outputting said commands including said predetermined G-code, said power output command, said pulse frequency command and said pulse duty ratio command;

servo amplifiers, connected to said numerical control means, for receiving said commands from said numerical control means and outputting drive commands;

servomotors, connected to said servo amplifiers, for receiving said drive commands for driving said servomottors;

a high frequency power source, connected to said numerical control system, for outputting a predetermined power, frequency and duty ratio determined by said commands from said numerical control system;

laser means, connected to said high frequency power source, an output of said laser means being oscillated and amplified by said commands from said high frequency power source; and valve means for providing assist gas, connected to said numerical control means, said commands from said numerical control system turning on and off said assist gas from said valves.

3. A laser oscillator control system according to claim 1, wherein said power output command is output by an address S, said pulse frequency command is output by an address P, and said pulse duty ratio command is output by an address Q.

4. A laser oscillator control system according to claim 1, wherein said program further comprises an assist gas control command.

* * * * *